United States Patent Office 3,539,617
Patented Nov. 10, 1970

3,539,617
DIFLUOROAMINO COMPOUNDS
Chester W. Huskins, Clay D. Howard, and Orval E. Ayers, Huntsville, Ala., assignors to the United States of America as represented by the Secretary of the Army
No Drawing. Original application Sept. 10, 1962, Ser. No. 222,736. Divided and this application Sept. 10, 1965, Ser. No. 487,108
Int. Cl. C07c 121/42, 69/34, 69/04
U.S. Cl. 260—465.5    13 Claims The invention described herein may be manufactured and used by or for the Government for governmental purpose without the payment of any royalty thereon.

This application is a division of application Ser. No. 222,736, filed Sept. 10, 1962.

This invention relates to novel chemical compounds, a method for their preparation, and a method for their use. More specifically, the invention concerns plasticizing agents for nitrated cellulose material, especially the nitrated cellulose employed in rocket fuels.

Many of the solid rocket propellant systems now in use are based on carbon-hydrogen-oxygen-nitrogen compositions. However, theoretical impulse calculations show a specific impulse limit of 250 lb.-sec./lb. for fuels of this type. Thus, to extend this limit, systems based on other fuel compositions must be devised. Further calculations show that propellant systems involving nitrogen-fluorine (N—F) and oxygen-fluorine (O—F) bonds having respective bond energies of —66 kilocalories and —46 kilocalories would raise the maximum specific impulse. Propellants based on carbon-hydrogen-oxygen-nitrogen-fluorine fuel composition could give a specific impulse of 280 lb.-sec./lb. or greater.

Theoretically, compounds which possess the groups ≡C—NF$_2$, =C=N—F, ≡C—O—NF$_2$ contain the desired N—F linkage and represent potentially useful propellant components. However, the synthesis of such compounds presents difficult problems. Direct fluorination is of limited value since fluorine is an unusually strong oxidizing agent. The fluorine replaces the hydrogen attached to the carbon atoms as well as the hydrogen of the amino or imino nitrogen giving rise to carbon-fluorine (C—F) bonds in addition to the desired N—F bonds. The C—F bond energy of —105.4 kilocalories renders the compounds containing such bonds unsuitable for propellants.

The search for useful compounds containing the N—F bond centered about those compounds incorporating the difluoroamino group, —NF$_2$. Investigations in this area led to the discovery of an unexpectedly superior group of difluoroamino compounds which may be employed as plasticizers or co-plasticizers for nitrated cellulose material as, for example, the nitrocellulose of propellant compositions.

The advantages of these plasticizers are immediately apparent to those skilled in the art. By utilizing these plasticizers in propellant compositions, introduction of N—F bonds into the fuel system is achieved. Furthermore, because of the plasticizing action, more uniform distribution of the difluoroamino oxidizer throughout the composition can be accomplished. Additionally, the N—F bond containing plasticizer can replace all or part of the conventional plasticizer thereby increasing the weight ratio of N—F bonds to the total weight of the composition. If the compound containing the N—F bond was merely added to the composition in addition to the other ingredients, the weight ratio of the N—F bonds to the total weight of the composition would obviously be less.

It is, therefore, an object of the invention to set forth novel chemical compounds which have as substituents two difluoroamino groups.

Another object of the present invention is to describe a novel class of difluoramino compounds suitable for utilization in double-base propellant compositions as a combination oxidizer and plasticizer.

A further object of this invention is to disclose a class of difluoramino substituted compounds which are capable of plasticizing nitrated cellulose containing compositions.

A still further object of the invention is to make known a method by which the compounds of the invention may be prepared.

An additional object of the instant invention is to describe a method for plasticizing propellant compositions which comprise nitrated cellulose as an essential ingredient by means of difluoramino containing plasticizers either alone or in combination with other conventional plasticizers.

The manner in which these and other objects can be accomplished will become apparent from the description presented herein below.

The compounds of the invention are nitriles of the formula N≡C—R, formic acid esters of the formula

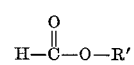

and dicarboxylic acid esters of the formula

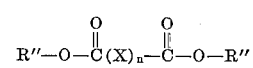

The variables R, R', and R'' are lower alkyl radicals having substituted thereon at each of two adjacent carbon atoms a difluoroamino group. Exemplary of these alkyl radicals are the following groups:

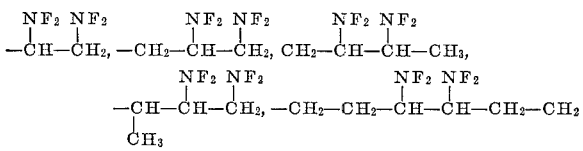

The variable X is an alkylene radical of up to two carbon atoms, straight or branched chain, while n has a value of zero or one.

Practical considerations related to the intended use impose carbon content limitations on the alkyl radicals R, R', and R''. The size of the molecules must be such that the compounds are liquids at the temperature ranges in which the propellant compositions are prepared. Moreover, the purpose of the compounds is to introduce N—F bonds into the composition. As the carbon-hydrogen-oxygen content of the molecule increases, the ratio of the weight of N—F bonds to the total weight of the composition diminishes. For these reasons the difluoroamino-substituted alkyl radicals represented by R, R', and R'' have carbon atom limitations of two to four, two to six, and two to three, respectively.

To determine the compatibility and storage characteristics of the difluoroamino compounds of the invention, studies were made of several compositions subjected to temperatures up to 150° F. for 48 hours and longer. The composition samples to be tested were deposited in small tubes and the tubes placed in a vacuum apparatus. A cooling bath lowered the temperature of the samples to 32° F. after which the system was evacuated. Helium was admitted to the system until the pressure was approximately 0.5 atmosphere. The system was then allowed to warm to ambient temperature and the equilibrium pressure recorded. The sample was subsequently heated to 150° F.

in a bath for at least 48 hours. The samples were allowed to cool to ambient temperature and the pressure again recorded. The two pressure readings indicated any change in the pressure of the system as a result of the prolonged heating. Decomposition products were condensed into mass spectrographic sample bulbs with nitrogen and identified by mass spectrographic analysis.

A comparison of the results obtained from samples of double-base propellant compositions containing conventional nitrate ester type plasticizers were compared with results of similar compositions containing the difluoro-amino-substituted plasticizers, it was seen that the latter groups of plasticizers did not adversely affect the stability of the tested composition. The novel plasticizers were found to be generally compatible with such double-base propellant ingredients as diethylene glycol dinitrate, glycerol trinitrate, triethyleneglycol dinitrate, nitrocellulose, carbon black, ammonium perchlorate, sodium perchlorate, potassium perchlorate, ammonium nitrate, sodium nitrate, and potassium nitrate. The difluoroamino derivatives proved to be unstable in the presence of amines and bases.

Double-base propellant compositions having the conventional metal fuel additives such as aluminum, boron, lithium, beryllium, and their respective hydrides, were also found to be compatible with the combination plasticizer-oxidizer of the invention.

Generally speaking, the compounds of the invention are prepared by the addition reaction of tetrafluorohydrazine with the corresponding ethylenically unsaturated

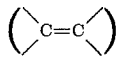

compounds. The examples given hereinbelow were conducted in a partial vacuum since a vacuum manifold was readily available and most of the final products were recoverable through the use of vacuum distillation means. However, for large scale production wherein pressurized vessels are easily employed, it is obvious that the use of superatmospheric pressure would facilitate the reaction due to the tetrafluorohydrazine existing in the gaseous state under the reaction conditions. Either reactant can be employed in excess or they may be employed in stoichiometric proportion. Because the tetrafluorohydrazine is gaseous, any excess thereof is easily removed upon completion of the reaction. For this reason, excess tetrafluorohydrazine will usually be employed. If the unsaturated reactant is unusually viscous or tends to polymerize easily, an inert organic solvent should be utilized to dissolve the unsaturated compound.

The final products are recovered by vacuum distillation means when feasible. If the product has a relatively high boiling temperature, as in the case of the esters of the dicarboxylic acids, any volatile material is distilled from the product and solid matter removed by filtration. There is a tendency for the vinyl compounds to polymerize under prolonged heating with resulting polymers forming a gunk in the reaction mass. It is this gunk which must be filtered from the product when the product does not lend itself to recovery by distillation means.

The following examples illustrate a method of preparation for the compounds of the invention:

EXAMPLE 1

One milliliter of allyl formate was placed in a five-hundred milliliter round bottom flask. The flask was connected to a glass vacuum manifold and cooled to −78° C. using a Dry Ice-acetone bath and then evacuated to a pressure of 1 mm. of mercury. Tetrafluorohydrazine was added until the pressure rose to 200 mm. of mercury at −78° C. The flask and its contents were then allowed to warm to room temperature and thereafter heated for four hours at a temperature which was maintained between 100° to 110° C. Excess gaseous tetrafluorohydrazine was removed. The product, 2,3-bis-(difluoroamino)-propyl formate was recovered by vacuum distillation at a pressure of one to two millimeters of mercury and a temperature of 35° to 40° C.

Analysis.—Calculated for $C_4H_6O_2N_2F_4$ (percent): C, 25.25; H, 3.16; F, 40.0. Found (percent): C, 24.25; H, 3.15; F, 38.85.

In the above example and those that follow, the low temperature (−78° C.) is necessitated by the volatility of the unsaturated reactant at reduced pressures. To obtain a reasonable quantity of the unsaturated reactant in the reaction vessel and, at the same time, maintain a pressure of less than atmospheric in the system requires a low initial temperature. The low temperature is not utilized to prevent decomposition of the reactants or slow the rate of the reaction. If a pressurized reaction container is employed, the low temperature is not required.

The 2,3-bis (difluoroamino)-propyl formate was further analyzed by its infrared spectra which showed absorption bands of 11.0 to 12.3 microns. This aborption is characteristic of the N—F bond. The nuclear magnetic resonance spectra indicated the presence of two adjacent difluoroamino groups with one group being on an end carbon atom.

The remainder of the novel compounds synthesized in Examples 2 through 6 were analyzed in the manner described above for the 2,3 - bis (difluoroamino)-propyl formate.

EXAMPLE 2

By substituting vinyl formate for the allyl formate of Example 1, there was prepared 1,2-bis (difluoroamino)-ethyl formate. The product was recovered by vacuum distillation at a pressure of one to three millimeters of mercury and a temperature of 25° to 30° C.

EXAMPLE 3

Replacing the allyl formate of Example 1 with 3-butenyl formate and heating for six hours at 110° C. resulted in the preparation of 3,4-bis (difluoroamino)-butyl formate. The product was recovered by vacuum distillation at a pressure of one to three millimeters of mercury and a temperature of 45° to 50° C.

EXAMPLE 4

By the substitution of acrylonitrile for the allyl formate in the procedure of Example 1, there is produced 2,3-bis (difluoroamino) propionitrile which is recovered at a pressure of one to three millimeters of mercury and a temperature of 25° to 30° C.

EXAMPLE 5

One milliliter of diallyl malonate dissolved in ten milliliters of chlorobenzene was substituted for the allyl formate of Example 1. The same procedure as outlined therein was followed with the exception that the heating step was conducted for nine hours. The product, di-[2,3-bis (difluoromamino)-propyl] malonate, a viscous oily liquid, was recovered by distilling the solvent and filtering the solid matter from the product.

EXAMPLE 6

The substitution of dially oxalate for the diallyl malonate of Example 5 results in the preparation of di-[2,3-bis (difluoroamino)propyl] oxalate which is recovered in the same manner as the malonic acid ester of Example 5.

Examples 7 and 8 are illustrative of the plasticizing action of the compounds of the invention for nitrated cellulose material when employed as the sole plasticizing agent or when employed in conjunction with conventional plasticizers.

EXAMPLE 7

The following compositions comprising the listed ingredients formed gels when cured for 72 hours at 120° F.

| | Composition, grams | |
|---|---|---|
| | A | B |
| I: | | |
| 2,3-bis(difluoroamino)-propyl formate | 0.4 | 0.3 |
| Nitrocellulose | 0.25 | 0.25 |
| Triethyleneglycol dinitrate | 0.0 | 0.10 |
| II: | | |
| 1,2-bis(difluoroamino)-ethyl formate | 0.2 | 0.15 |
| Nitrocellulose | 0.125 | 0.125 |
| Triethyleneglycol dinitrate | 0.0 | 0.05 |
| III: | | |
| 2,3-bis(difluoroamino)-propionitrile | 0.20 | 0.15 |
| Nitrocellulose | 0.125 | 0.125 |
| Triethylene glycol dinitrate | 0.0 | 0.05 |
| IV: | | |
| di-[2,3-bis(difluoroamino)-propyl]malonate | 0.20 | 0.15 |
| Nitrocellulose | 0.125 | 0.125 |
| Triethyleneglycol dinitrate | 0.0 | 0.05 |

EXAMPLE 8

The following composition formed a gel when cured for 48 hours at room temperature.

| | Grams | |
|---|---|---|
| | A | B |
| 3,4-bis(difluoroamino)-butyl formate | 0.20 | 0.1 |
| Nitrocellulose | 0.125 | 0.12 |
| Triethyleneglycol dinitrate | 0.0 | 0.0 |

Useful propellant compositions can be prepared by substituting the difluoroamino plasticizer for all or part of the conventional plasticizer in the double-base propellant compositions of the prior art. Generally speaking, the compositions now in use employ metals or their hydrides as a fuel. The metal can constitute from 12% to 20% by weight of the composition; nitrocellulose, 15% to 20%; plasticizer, 34% to 38%; the remainder being mainly an inorganic oxidizer. These percentages are illustrative of the general composition of the nitrated cellulose containing propellants but are not limitations of the invention since the plasticizers will function satisfactorily outside these ranges. Some of the compositions also employ various modifiers to accelerate or retard oxidation. The ingredients comprising the composition are mixed according to standard techniques and then cured. To effect the cure, it may be necessary to apply heat at a temperature of 100° F.–150° F. over a forty-eight to seventy-two hour period. Although a cure is sometimes achieved when the composition stands at room temperature as shown in Examples 7 and 8. However, the compounding and curing of double-base propellants are well recognized procedures in the art and can be applied to compositions using the plasticizers of the invention.

Table I sets forth five specific compositions which can be used as propellants for rocket motors. This list is for the sole purpose of illustrating the type of composition which utilizes difluoroamino plasticizers and is in no way to be construed as a limitation in the use of the novel compounds of the invention.

TABLE I

| Composition ingredients | Percent by weight of composition | | | | |
|---|---|---|---|---|---|
| | No. 1 | No. 2 | No. 3 | No. 4 | No. 5 |
| Nitrocellulose | 35.3 | 24.07 | 20.0 | 16.0 | 16.0 |
| Nitroglycerin | 2.92 | 2.0 | | | |
| Triethyleneglycol dinitrate | 30.5 | 10.4 | | | |
| Dioctyl phthalate | 0.04 | 0.03 | | | |
| Carbon black | .13 | 0.09 | | | |
| 2-nitrodiphenylamine | .78 | 0.62 | | | |
| Ammonium perchlorate | | 31.9 | 30.0 | 35.0 | 35.0 |
| Aluminum | | | | 15.0 | |
| Boron | | | | | 15.0 |
| di-[2,3-bis-(difluoroamino) propyl] malonate | | | | | 34.0 |
| 1,2,3-tris-(difluoroamino) propane | | | 25.0 | | |
| 2,3-bis-(difluoroamino) propyl formate | 30.5 | 31.1 | 25.0 | | |
| 2,3-bis-(difluoroamino) propionitrile | | | | 34.0 | |

Composition No. 3 is of particular interest since it exemplifies the use of one of the difluoroamino substituted plasticizers in conjunction with another difluoroamino substituted compounds, 1,2,3-tris-(difluoroamino)-propane. Such a composition greatly increases the N—F bond content of the propellant composition.

There are obviously many modifications and variations of the invention which are possible in view of the detailed teachings presented hereinabove. It is to be understood, therefore, that the invention is limited only by the scope of the appended claims.

We claim:

1. A compound selected from the group consisting of

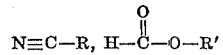

and

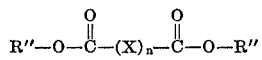

wherein R, R′, and R″ are alkyl radicals having substituted thereon at each of two adjacent carbon atoms a difluoroamino group, said alkyl radicals having respective carbon atom limitations of two to four, two to six, and two to three; X is an alkylene group of up to two carbon atoms, and $n$ has a value of zero and 1.

2. A compound of the formula N≡C—R wherein R is an alkyl radical of two to four carbon atoms having substituted thereon at each of two adjacent carbon atoms a difluoroamino group.

3. A compound of the formula

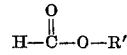

wherein R′ is an alkyl radical of two to six carbon atoms having substituted thereon at each of two adjacent carbon atoms a difluoroamino group.

4. A compound of the formula

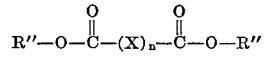

wherein R″ is an alkyl radical of two to three carbon atoms having substituted thereon at each of two adjacent carbon atoms a difluoroamino group; X is an alkylene group of up to two carbon atoms; and $n$ has a value of zero and one.

5. A compound of the formula

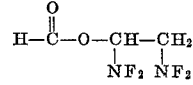

6. A compound of the formula

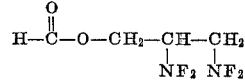

7. A compound of the formula

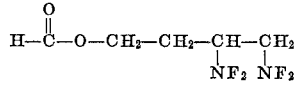

8. A compound of the formula

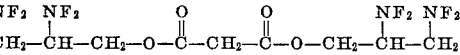

9. A compound of the formula

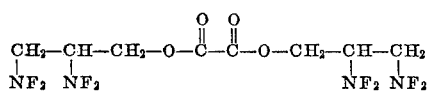

10. A compound of the formula

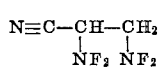

11. The method of preparaing a compound of the formula N≡C—R where R is an alkyl radical of two to four carbon atoms having substituted thereon at each of two adjacent carbon atoms a difluoramino group, said method comprising contacting a compound of the formula N≡C—X wherein X is an alkenyl radical of two to four carbon atoms with tetrafluorohydrazine to cause a chemical reaction, and recovering said compound of the formula N≡C—R from said reaction.

12. A method for preparing a compound of the formula

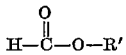

wherein R' is an alkyl radical of two to six carbon atoms having substituted thereon at each of two adjacent carbon atoms a difluoroamino group, said method comprising contacting a compound of the formula

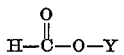

wherein Y is an alkenyl radical of two to six carbon atoms with tetrafluorohydrazine to cause a chemical reaction, and recovering said compound of the formula

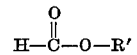

from said reaction.

13. The method of preparing a compound of the formula

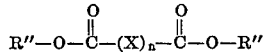

wherein R'' is an alkyl radical of two to three carbon atoms having substituted thereon at each of two adjacent carbon atoms a difluoroamino group, X is an alkylene radical of up to two carbon atoms, and $n$ has a value of zero and 1, said method comprising contacting a compound of the formula

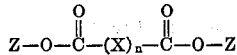

wherein Z is an alkenyl radical of two to three carbon atoms, X and $n$ are as previously defined, with tetrafluorohydrazine to cause a chemical reaction, and recovering said compound of the formula

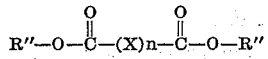

from said reaction.

References Cited

UNITED STATES PATENTS

| | | | |
|---|---|---|---|
| 2,963,468 | 12/1960 | Cleaver | 260—87.5 |
| 3,214,465 | 10/1965 | Sausen | 260—543 |
| 3,215,709 | 11/1965 | Logothetis | 260—349 |
| 3,440,271 | 4/1969 | Engel | 260—465.5 |

OTHER REFERENCES

Hoffman et al., Chem. Reviews, vol. 62, 1962, page 14, QDI A563.

LELAND A. SEBASTIAN, Primary Examiner

U.S. Cl. X.R.

149—96, 109; 260—485, 488